(12) United States Patent
Maloney et al.

(10) Patent No.: US 11,493,075 B2
(45) Date of Patent: Nov. 8, 2022

(54) TORQUE LIMITING SCREW

(71) Applicant: Penn Engineering & Manufacturing Corp., Danboro, PA (US)

(72) Inventors: Michael Maloney, Doylestown, PA (US); Robert Stotz, Jr., Sellersville, PA (US)

(73) Assignee: Penn Engineering & Manufacturing Corp., Danboro, PA (US)

( * ) Notice: Subject to any disclaimer, the term of this patent is extended or adjusted under 35 U.S.C. 154(b) by 351 days.

(21) Appl. No.: 16/878,067

(22) Filed: May 19, 2020

(65) Prior Publication Data

US 2020/0370588 A1    Nov. 26, 2020

Related U.S. Application Data

(60) Provisional application No. 62/850,664, filed on May 21, 2019.

(51) Int. Cl.
| | |
|---|---|
| *F16B 33/04* | (2006.01) |
| *F16B 31/02* | (2006.01) |
| *F16B 23/00* | (2006.01) |
| *F16B 29/00* | (2006.01) |

(52) U.S. Cl.
CPC ........ *F16B 31/027* (2013.01); *F16B 23/0061* (2013.01); *F16B 29/00* (2013.01)

(58) Field of Classification Search
CPC ....... F16B 31/02; F16B 23/0061; F16B 29/00
USPC .............................................. 411/375, 3, 6, 7
See application file for complete search history.

(56) References Cited

U.S. PATENT DOCUMENTS

| | | | | |
|---|---|---|---|---|
| 3,374,014 | A * | 3/1968 | Kull ......................... | F16J 15/00 257/733 |
| 3,929,054 | A * | 12/1975 | Gutshall ................ | F16B 31/021 411/5 |
| 4,601,623 | A * | 7/1986 | Wallace ................. | F16B 39/026 411/336 |
| 5,795,116 | A * | 8/1998 | Frank ...................... | F16B 23/00 411/6 |
| 6,309,154 | B1 * | 10/2001 | Higgins ................. | F16B 31/027 81/475 |
| 6,364,585 | B1 * | 4/2002 | Sakamoto ............. | F16B 31/027 411/408 |
| 6,364,688 | B1 * | 4/2002 | Fraley, II ............. | H01R 13/639 411/7 |
| 6,802,680 | B1 * | 10/2004 | Rubenstein ........... | F16B 31/021 411/908 |

(Continued)

*Primary Examiner* — Gary W Estremsky
(74) *Attorney, Agent, or Firm* — Gregory J. Gore, Esq.

(57) ABSTRACT

A compound screw is a two-piece assembly where the head of the screw can rotate in the tightening direction to a designed tightening torque to drive the screw while being able to positively counter-rotate in the loosening direction. The screw assembly comprises a screw and a cap surrounding the head of the screw. The screw has a head at the top and a threaded shank downwardly extending from a base of the screw head. The screw is turned by turning the cap about a central axis of the screw. The cap is rotatably affixed to the screw head by a loose riveting of the cap to the top most end of the screw head by flaring a thin-walled upwardly extending portion thereof. The cap includes a plurality of axially extending peripheral resilient arms which engage peripheral cam surfaces around the outside of the screw head.

8 Claims, 2 Drawing Sheets

(56) References Cited

U.S. PATENT DOCUMENTS

| | | | | |
|---|---|---|---|---|
| 2014/0093329 A1* | 4/2014 | Levien | .................... | F02M 3/08 |
| | | | | 411/393 |
| 2014/0147226 A1* | 5/2014 | Andrade de Souza | . | F16B 31/00 |
| | | | | 411/3 |
| 2014/0334894 A1* | 11/2014 | Marchand | ............... | F16L 47/04 |
| | | | | 411/1 |
| 2015/0224939 A1* | 8/2015 | Flaherty | .................. | G05G 1/08 |
| | | | | 74/491 |
| 2017/0288319 A1* | 10/2017 | Vanzetto | ................ | F16B 31/02 |

* cited by examiner

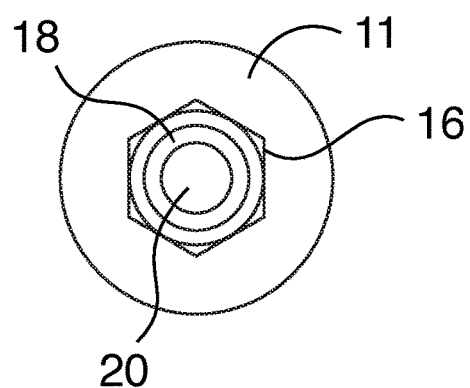
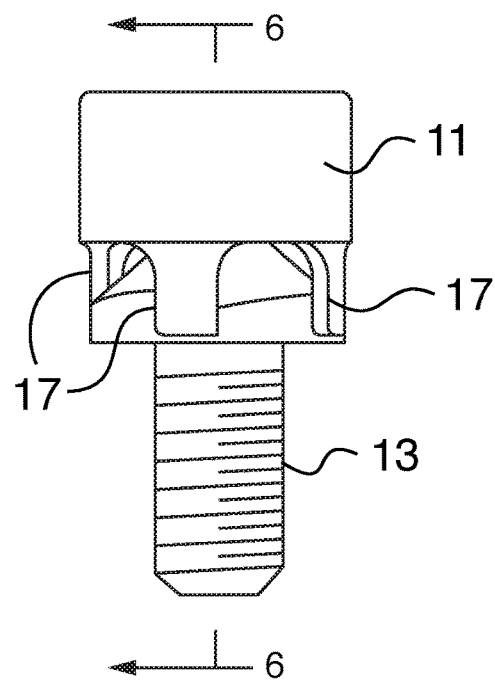
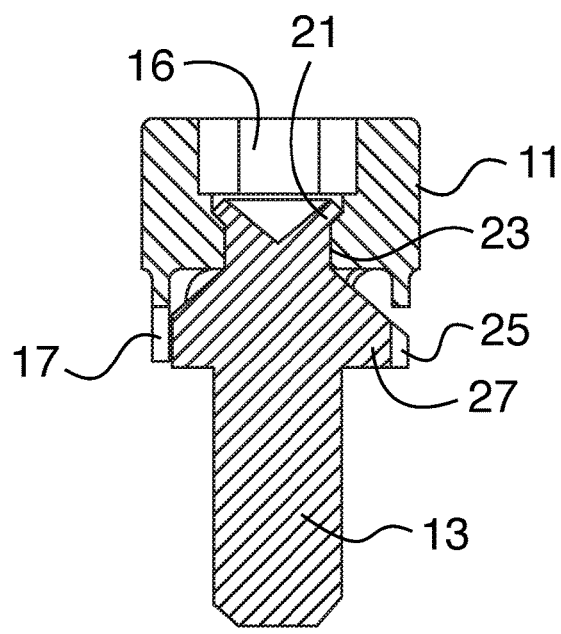
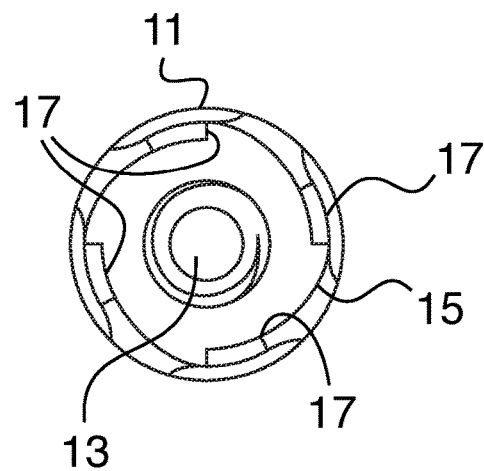

TORQUE LIMITING SCREW

RELATED APPLICATIONS

This is a non-provisional patent application related to provisional patent application entitled, "Torque Limiting Screw" filed on May 21, 2019, Ser. No. 62/850,664 priority from which is hereby claimed.

FIELD OF THE INVENTION

The present invention relates to fasteners such as screws and bolts. More specifically, it relates to fasteners of the type which can non-destructively limit the amount of torque supplied to turn the fastener.

BACKGROUND OF THE INVENTION

Torque limiting screws can be commonly found. One type of screw has a two-section head with a driver portion and a head portion. The connecting metal between the two is of a thinner section, so that it will break at the desired torque. This requires driving from the outside of the head of the part, which precludes installing the head into a counter bore. Metal flakes can also shear off during the breaking-off process.

Other types of torque limiting screws have complicated friction disk clutches and springs in their heads which are more like knobs. While this is effective for large thumb screw or knob type of fasteners, it is not helpful for small assemblies. Standard screws can be installed to a desired torque using a torque wrench, but standard screws can still be over tightened, even with a torque wrench.

The main reason for specifying a torque limiting screw is to prevent damage to an assembly due to overtightening of the screw. There is therefore a need in the fastening art for a torque limiting screw which is economical to manufacture and which can easily be varied in design to suit a wide range of applications.

SUMMARY OF THE INVENTION

The present screw is a two-piece assembly where the head of the screw can rotate in the tightening direction to a designed tightening torque to drive the screw while being able to counter-rotate in the loosening direction. The screw assembly comprises a screw and a cap surrounding the head of the screw. The screw has a head at the top and a threaded shank downwardly extending from a base of the screw head. The screw is turned by turning the cap about a central axis of the screw. The cap is rotatably affixed to the screw head by a loose riveting of the cap to the top most end of the screw head by flaring a thin-walled upwardly extending portion thereof. The cap includes a plurality of axially extending peripheral arms which engage the outside of the screw head.

The outside of the screw head is defined in part by peripheral engagement teeth separated by cam surfaces each having points which vary in distance from the central axis of the screw. The arms of the cap are disposed to frictionally engage the cam's outer surfaces. The cams surfaces may be axially tapered to supply the desired amount of design torque transferred from the cap to the screw. Adjacent cam surfaces are connected by peripheral teeth defined by a radial wall which bridges the area between points of radial distance variance between the adjacent cam surfaces.

As the screw is turned, the cap torque arms are pushed outwardly by engagement with the top edge of the cams. Once the design torque is met or exceeded, the cap arms will simply slide along the cam and then audibly "click" as they are turned past the radial wall and ten spring back against the next cam surface. The cap arms will positively engage the screw teeth radial walls in the removal direction to remove the screw without a non-destructive torque limit.

The fastener disclosed herein cannot be overtightened, and does not require the use of a torque wrench. The cap through bore permits access of the riveting tool from above providing easy screw/cap assembly. In addition to its torque limiting function it can be used in standard assembly operations where socket head cap screws are used, both in large and miniature assemblies such as consumer electronics.

From the following drawings and description of one embodiment of the invention it will be apparent to those of skill in the art that the objects of the invention to provide a torque limiting screw which is economical to manufacture and which can easily be varied in functionality has been achieved.

BRIEF DESCRIPTION OF THE DRAWINGS

FIG. 4 is top plan view.

FIG. 5 is a front elevation view.

FIG. 6 is an elevation sectional view taken along line A-A of FIG. 5.

FIG. 7 is a bottom plan view with arrows showing opposite directions of rotation.

DETAILED DESCRIPTION OF ONE EMBODIMENT OF THE INVENTION

Figure 1:
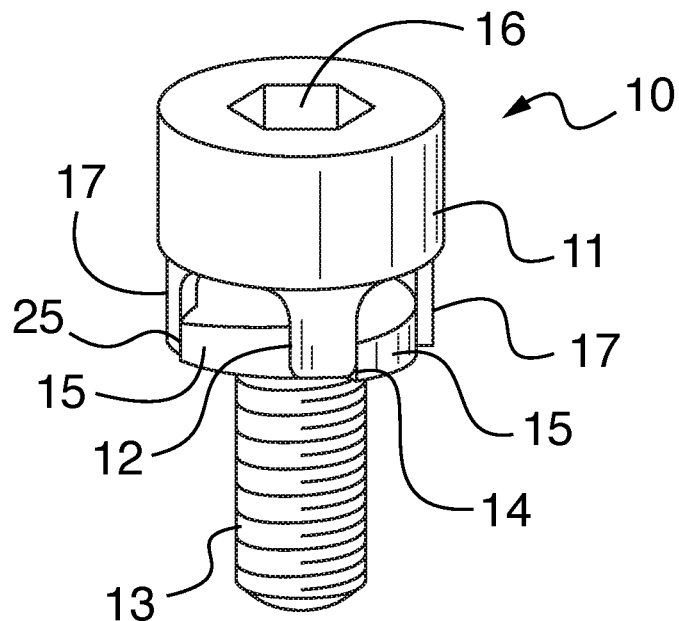
FIG. 1 is a top front perspective view of the present fastener assembly.

Referring to FIG. 1, the main components of the fastener invention 10 are cap 11 and screw 13. The cap has a body 9 from which resilient arms 17 extend downwardly. The cap 11 surrounds a head of the screw 13 and has a drive socket 16 at the top. A threaded shank of the screw extends downward from a base of the screw head. The arms 17 resiliently grip cams 15 around the base of the screw as the screw is turned in the tightening direction. The cams 15 are separated by radial walls which define the structure of each tooth 25. Each arm 17 has leading and trailing edges 12 and 14, respectively. The trailing edge 14 engages a radial wall of the peripheral engagement teeth when the cap is turned in the loosening direction.

Figure 2:
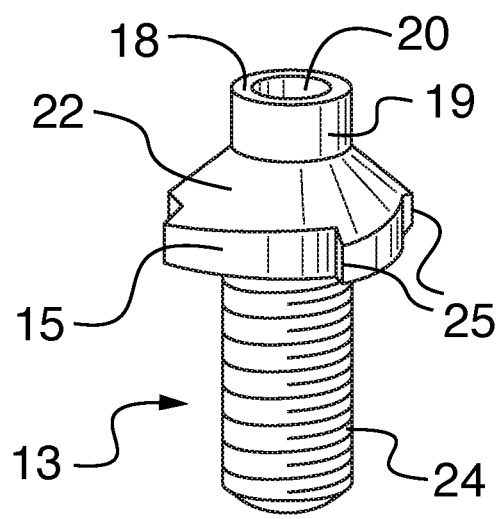
FIG. 2 is a top front perspective view of the screw component.

Referring now to FIG. 2, the screw component 13 is shown in isolation. The screw head 22 has a planar base from which the threaded shank 24 extends. The head has a narrowed neck 19 and a depression or well at the top which forms a deformable rim 18. The engagement teeth are contiguously separated by cams 15. Each cam surface is defined by a ramp which has points that progressively vary in distance from a central axis of the fastener.

Figure 3:
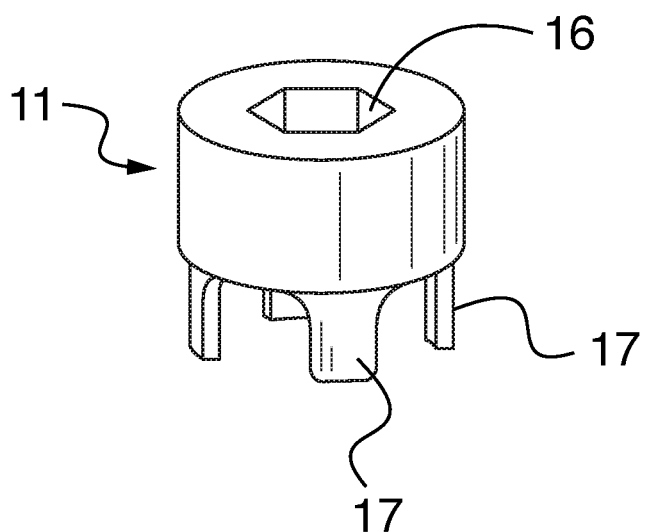
FIG. 3 is a top front perspective view of the cap component.

Referring to FIG. 3, the cap component 11 is seen in isolation. A main body 9 of the cap has downward extending resilient arms 17 and a drive socket 16 at the top.

In FIG. 4 we see a top view of the fastener with cap 11 having drive socket 16 which can receive a tool for turning the fastener. A well 20 in the top of the screw defines a thin-walled deformable rim 18 which is used to loosely rivet the screw to the cap with minimal axial play as seen in FIG. 6.

FIGS. 5 and 6 show elevation views with FIG. 6 revealing the internal relationship between the cap 11 and the screw 13. Here we see that flared portions of the screw neck rim 21 loosely rivet the cap to the screw by captivating an inner collar 23 of the cap 11 between the flared rim 21 and the enlarged planar base 27 of the screw 13. The cap through bore which is open at the top permits rivet tool access through the open socket from above. This contributes to the ease and economy of manufacture which is a significant advantage of the invention. A trailing edge of cap arm 17 will engage tooth radial wall 25 when he fastener is turned in the loosening direction.

Referring now to FIG. 7, this bottom view shows screw 13 in the position with the cap arms 17 engaging the radial walls of the screw teeth 25. If the cap 11 is turned counter clockwise in this view denoted by the outermost arrow, the cap arms will begin ride up the cams 15 while imparting a frictional turning force to the screw. Each of the cam surfaces is defined by a ramp which has points that progressively vary in distance from a central axis of the screw. If the cap is turned in the opposite direction the cap arms are in positive engagement with the teeth radial walls and a direct turning force will be transmitted. Note that as normally seen from above rather than this bottom view the rotational directions would be reversed. Thus, the limited frictional force transmitted to the screw occurs in the clockwise direction as a right-handed screw thread would be tightened.

As the fastener is normally operated, the torque arms on the cap frictionally engage ramps on the cam portion to drive the screw into a female thread. The torque arms impart a spring force toward the center of the screw to grip the screw, much like fingers on a hand. As the arms slide on the ramped cam surfaces, the spring force and concomitant friction increases until the arms slide off of the end of the ramps and are back at the low points of the next cam's ramp again. This effectively limits the torque that the cap can impart onto the screw. In the reverse screw-loosening direction, the arms push against the flat radial wall surfaces on the ratchet teeth to positively drive the screw out.

As the cap and screw are turned in the tightening direction (usually clockwise), the arms on the cap are deflected outward by the cams on the screw head as the screw is turned. The force generated by the arms' deflection can be estimated using standard cantilevered beam deflection formulae, or simulation. The arms are pushed outward at the intersection of the arms and the cam on the head of the screw. For proper operation, the arms must not be deflected past the point which would cause the yielding of the cap material. As the screw is turned, the arms are pushed near their midpoint in height. The lower part of the arm is used only to turn the screw out by pushing the trailing edge against the flat radial wall surface at the end of the cam.

A balance between the area of the arms needed for removal and the deflection to not yield must be met. The cams can be tapered such that the axial length of cams is reduced as the screw is turned in the positive direction. This provides an axially downward slope of the contact point between the cap and the screw which aids in meeting this balance. Since the length of the arms which are being subjected to a bending force is increased, the effect is an easing of the beam deflection as the screw is turned.

The fastener protects the surface of the component being tightened against in part by limiting the length of the cap arms. Once the base of the screw contacts the top assembly component, the screw will stop turning, while the head of the screw continues to turn to apply the appropriate torque. During this phase of tightening, the relative motion between the screw and the cap could cause damage to the top component if there were contact between the cap torque arms and the top component. The vertical gap between the ends of the arms and the plane of the base of the screw head shown in the FIG. 5 prevents this contact. The radius on the leading edge of the arms also ensures that a sharp edge will not be present to dig into the top component.

Generally speaking, the number of torque arms can be changed so that fewer or more torque arms can be employed Changing the number of torque arms may be necessary to strengthen a torque arm configuration and will be used with the methods listed below to arrive at the desired torque limit.

There are several ways to adjust the torque being transferred to the cam surfaces of the torque limiting screw.
1. Adjust the thickness of the torque arms. Thickening the torque arms makes them stiffer, which will transfer greater torque. Making them thinner makes them more flexible, transferring less torque.
2. Adjust the radius at the base of the torque arms. A larger radius is stiffer, therefore transferring more torque. A smaller radius is more flexible, transferring less torque. A larger radius effectively shortens the more flexible part of the arm. A smaller radius creates a longer section that is more flexible.
3. Adjust the length of the torque arms. Longer arms are more flexible (less torque transferred), shorter arms are stiffer (more torque transferred).
4. Adjust the coefficient of friction between the cap and the screw. The cap and screw can be made of different materials, and/or different mating finishes, allowing for a greater or lesser friction coefficient. Less friction will transfer less torque, and more friction will transfer more torque.

The foregoing illustrates but one embodiment of the invention. It will be apparent to those of skill in the art that there can be various adaptations and modifications of what has been shown and described without departing from the spirit and scope of the invention. It should be understood that the invention is limited only by the following claims and their legal equivalents.

What is claimed is:
1. A torque limiting screw assembly, comprising:
   a screw and a cap surrounding the screw rotatably secured to the screw;
   the screw comprising:
      a screw head having a narrowed neck at the top and a base of enlarged diameter at the bottom, the top of the neck having a central well defining a deformable rim;
      a base of the screw head having a plurality of peripheral radial teeth with contiguous cams each having outward facing surfaces between each of the teeth; and
      a threaded shank extending downward from the base;
   the cap comprising:
      a body with a plurality of resilient torque-transmitting arms extending downwardly from the body, said resilient arms disposed such that inward facing surfaces of the arms engage the screw head cams;
      the arms having trailing edges engageable with radial walls of the screw head teeth in a first direction of rotation and not in a second opposite direction of rotation, wherein rotation of the cap in the second direction of rotation imparts a preselected torque to the screw by the gripping friction of the arms against the cams; and an axial through bore of the cap having an internal radial collar of decreased inside diameter;

means for rotatably captivating the cap to the screw comprising the screw neck rim deformed to capture the cap internal collar between the neck rim and the screw head base.

2. The screw assembly of claim 1 wherein the cap arms are constructed and disposed such that they apply an inward spring force against the screw cams.

3. The screw assembly of claim 2 wherein a bottom surface of the screw head is planar.

4. The screw assembly of claim 3 wherein the ends of the cap arms fall axially short of the screw head base such that there is a vertical gap between the ends of the arms and the plane of the base.

5. The screw assembly of claim 1 wherein the cap and the screw are loosely and rotatably joined with minimal axial play.

6. The screw assembly of claim 1 wherein each screw cam surface is defined by a ramp which has points that progressively vary in distance from a central axis of the screw.

7. The screw assembly of claim 1 in which the top of the cap through bore is a socket with tool engaging surfaces for turning the screw assembly.

8. The screw assembly of claim 1 wherein each of the screw head base teeth has a radial wall engageable with a trailing edge of one of the cap arms.

* * * * *